United States Patent [19]
Billings et al.

[11] 3,906,111
[45] Sept. 16, 1975

[54] HALOGENATED METHYLCYCLOPROPYL ETHERS FOR INDUCING A STATE OF ANESTHESIA

[75] Inventors: Charles Alden Billings, Concord; Gerald Joseph O'Neill, Arlington; Charles William Simons, Bedford, all of Mass.

[73] Assignee: W. R. Grace & Co., Cambridge, Mass.

[22] Filed: Mar. 15, 1974

[21] Appl. No.: 451,677

[52] U.S. Cl. .............................................. 424/342
[51] Int. Cl.² .......................................... A61K 31/08
[58] Field of Search ...................... 424/342; 260/611

[56] References Cited
UNITED STATES PATENTS
3,557,294  1/1971  Dear et al. ........................... 424/342

Primary Examiner—Jerome D. Goldberg
Attorney, Agent, or Firm—Armand McMillan; C. E. Parker

[57] ABSTRACT

The following halogenated methylcyclopropyl ethers have been found useful as general inhalation anesthetics: 1-methoxy-1,2,2,3-tetrafluoro-3-chlorocyclopropane, 1-methoxy-1,2,3-trifluoro-2,3-dichlorocyclopropane, 1-methoxy-1,2,2-trifluoro-3,3-dichlorocyclopropane and 1-methoxy-1,2,2,3-tetrafluoro-3-bromocyclopropane.

5 Claims, No Drawings

HALOGENATED METHYLCYCLOPROPYL ETHERS FOR INDUCING A STATE OF ANESTHESIA

THE PRIOR ART

In the continuing search for new general inhalation anesthetics, there has been tested in recent years more than one hundred halogenated aliphatic ether compounds. While a number of these have been found useful for the purpose intended, an examination of the behavior of typical compounds in the class, as reported by Larsen [Fluorine Chemistry Reviews 3, pages 38 and 39 (1969)], fails to reveal any firm structural criteria to guide present and future investigators toward species of utility. As to ethers involving cyclic structures, on the other hand, the teachings of the art are even less enlightening. As Larsen reports in the above cited compendium (on page 40), not one of the few fluorinated cyclopentyl and cyclohexyl alkyl ethers tested has shown any promise in the field of anesthesia. The pattern that emerges, if any, is almost entirely negative. On the subject of the physiological behavior of the type of compound with which the present disclosure is concerned, i.e. fluorinated cyclopropyl alkyl ethers, the literature is silent.

SUMMARY OF THE INVENTION

It has now been discovered that newly synthesized 1-methoxy-1,2,2,3-tetrafluoro-3-chlorocyclopropane, 1-methoxy-1,2,3-trifluoro-2,3-dichlorocyclopropane, 1-methoxy-1,2,2-trifluoro-3,3-dichlorocyclopropane and 1-methoxy-1,2,2,3-tetrafluoro-3-bromocyclopropane possess high potency as general anethetics when administered to inhalation-anesthetic-susceptible organisms.

DETAILED DESCRIPTION

The compounds which constitute the basis of this invention may be prepared by any of several methods depending on the availability of starting materials and on the yield considered acceptable under the circumstances. These methods ultimately involve a cyclization reaction between a suitable halocarbene (:CYZ) and an appropriate olefinic compound:

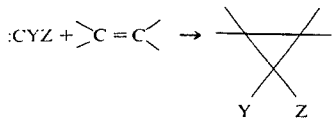

The halocarbene may be generated by the decomposition of a number of precursors, including phenyl(-trihalomethyl) mercury compounds, according to the method of D. Seyferth et al. [J. Am. Chem. Soc. 87, 4259–70 (1965)] or a properly halogenated fluoropropylene oxide [J. Org. Chem. 31, 2312 (1966)]. The actual method employed in the present instance, as described in the following examples, is an adaptation of a procedure for the general synthesis of gem-dihalocyclopropanes [Synthesis 2, 112 (1973)].

EXAMPLES 1 to 4

The methyl cyclopropanes of the invention were prepared by the cyclization of a carbene: CYZ with an appropriate olefin. The carbene was prepared in concentrated sodium hydroxide solution from an appropriate trihalomethane with the assistance of an ionic salt such as triethylbenzylammonium bromide. The assumed reactions involved are:

$R_4N^+X^- + OH^- \rightarrow R_4N^+O^-H + X^-$   (1)
$CHXYZ + R_4N^+O^-H \rightleftharpoons CXYZR_4N^+ + H_2O$   (2)
$CXYZR_4N^+ \rightarrow :CYZ + R_4N^+X^-$   (3)

The quaternary ammonium hydroxide formed (1), being insoluble in the reaction mixture, migrates to the boundary between the aqueous and the organic phases where it reacts with the trihalomethane to yield the quaternary ammonium derivative of the trihalomethyl anion (2). After diffusion into the organic phase, the derivative is transformed (3) into the carbene:CYZ and the catalyst halide. The carbene then reacts with the olefin to yield a cyclopropane compound.

In a typical preparation, for instance that of Example 1, 50% aqueous sodium hydroxide, 125 ml, is placed into a 300 ml stainless steel autoclave with triethylbenzlammonium bromide, 1.0 g, dichlorofluoromethane, 0.75 mole, and trifluorovinyl methyl ether, 0.5 mole. The contents of the autoclave are stirred at ambient temperature until all the halogenated methane has been consumed, in this case a period of 24 hours. The reaction mixture is vacuum distilled to collect the organic phase and the distillate is further refined by redistillation after separation of entrained water. Clear colorless liquid 1-methoxy-1,2,2,3-tetrafluoro-3-chlorocyclopropane is obtained, as identified by specific gravity and boiling point (Table II), in yield of 16%, based on the methane, and 69%, based on the olefin.

The olefinic and halogenated methane starting materials employed and the product obtained in this and other examples are listed in the following table.

TABLE I

PREPARATION OF CYCLOPROPYL METHYL ETHERS

| Ex. | Starting Materials | Product Yield (on olefin) | Mol. Wt | Spec. Gravity ($d_4^{20}$) | Boiling Point (°C) |
|---|---|---|---|---|---|
| 1 | CHFCl$_2$ <br> CF$_2$=CF—OCH$_3$ | 1-methoxy-1,2,2,3-tetrafluoro-3-chlorocyclopropane <br> 69% | 178 | 1.420 | 70–71° |
| 2 | CHFCl$_2$ <br> CFCl=CF—OCH$_3$ | 1-methoxy-1,2,3-trifluoro-2,3-dichlorocyclopropane <br> 44% | 194.98 | 1.467 | 106° |
| 3 | CHCl$_3$ <br> CF$_2$=CF—OCH$_3$ | 1-methoxy-1,2,2-trifluoro-3,3-dichloropropane <br> 65% | 194.98 | 1.467 | 105–6° |
| 4 | CHFBr$_2$ <br> CF$_2$=CF—OCH$_3$ | 1-methoxy-1,2,3,4-tetrafluoro-3-bromocyclopropane <br> 69% | 222.98 | 1.732 | 90° |

The compounds of Table I are clear colorless liquids at room temperature. They can be stored in containers of the type commonly used for conventional anesthetics of comparable boiling point, e.g. bromochlorotrifluoroethane (halothane), and they can be administered by means of apparatus or machines designed to vaporize liquid anesthetics and mix them with air, oxygen, or other gaseous combinations in amounts capable of supporting respiration. It is further contemplated that the compounds may be used in admixture with pharmaceutically acceptable diluents and stabilizers (e.g. thymol), or in combination with one or more of the known inhalation anesthetics, e.g. nitrous oxide, ether, halothane, chloroform and 2,2-dichloro-1,1-difluoroethyl methyl ether (methoxyflurane).

EXAMPLES 5 to 8

The physiological effects of the cyclopropanes prepared in the preceding examples were demonstrated as follows, using a standard test for evaluation of inhalation anesthetics similar to that described in Robbins [J. Pharmacology and Experimental Therapeutics 86, 197 (1946)].

Mice were exposed to the anesthetic for a period of 10 minutes in a rotating drum. Observations were then made of the pinch reflex, the corneal reflex and the return of the righting reflex. At least four graded doses were employed to determine the minimum concentration required to anesthetize 50% of the mice used ($AC_{50}$) and the minimum concentration required to kill 50% of the mice ($LC_{50}$). The anesthetic index (AI) was then calculated from these minimum concentrations. The results of these tests are summarized in the following table.

TABLE II

ANESTHETIC PROPERTIES OF 1-METHOXY-CYCLOPROPANES

| Ex. | 1-Methoxycyclopropane | $AC_{50}$ (% volume) | $LC_{50}$ (% volume) | AI ($LC_{50}/AC_{50}$) |
|---|---|---|---|---|
| 5 | 1,2,2,3-tetraF-3-Cl- | 2% | 8% | 4 |
| 6 | 1,2,3-triF-2,3-diCl- | <0.75% | >3% | >4 |
| 7 | 1,2,2-triF-3,3-diCl- | <1% | 4% | >4 |
| 8 | 1,2,2,3-tetraF-3-Br | <1% | 5% | >5 |

As these results indicate, four effective inhalation anesthetic agents have been added to the art. Their potency and safety can be better visualized by comparing the values reported in Table II to those obtained for the two well known anesthetics — ethyl ether and halothane, under the same testing conditions, namely an anesthetic concentration ($AC_{50}$) of about 3.7 and 0.80 respectively and an anesthetic index ($LC_{50}/AC_{50}$) of 3.2 and 3.4, also respectively. The compounds of the invention, therefore, are as potent as widely used halothane and yet possess a greater margin of safety in administration than either ether or halothane, as shown by their respective anesthetic indexes.

It should be understood that the concentration of any of the above compounds employed for anesthetic purposes must depend on the subject to be anesthetized, the level of anesthesia desired, the rate at which this state is to be induced and the period of time during which it is to be maintained. Such variations falls within the spirit and the scope of the present invention as claimed.

What we claim is:

1. The process for inducing a state of anesthesia which comprises administering by inhalation to a mammal an effective quantity, for inducing a state of anesthesia, of a compound selected from the group consisting of 1-methoxy-1,2,2,3-tetrafluoro-3-chlorocyclopropane, 1-methoxy-1,2,3-trifluoro-2,3-dichlorocyclopropane, 1-methoxy-1,2,2-trifluoro-3,3-dichlorocyclopropane and 1-methoxy-1,2,2,3-tetrafluoro-3-bromocyclopropane.

2. The process of claim 1 wherein the compound administered is 1-methoxy-1,2,2,3-tetrafluoro-3-chlorocyclopropane.

3. The process of claim 1 wherein the compound administered is 1-methoxy-1,2,3-trifluoro-2,3-dichlorocyclopropane.

4. The process of claim 1 wherein the compound administered is 1-methoxy-1,2,2-trifluoro-3,3-dichlorocyclopropane.

5. The process of claim 1 wherein the compound administered is 1-methoxy-1,2,2,3-tetrafluoro-3-bromocyclopropane.

* * * * *